Patented June 23, 1936

2,044,891

UNITED STATES PATENT OFFICE 2,044,891

SUBSTANTIVE AZODYESTUFFS AND PROCESS OF MAKING SAME

Hans Schindhelm, Frankfort-on-the-Main-Fechenheim, Germany, assignor to General Aniline Works, Inc., New York, N. Y., a corporation of Delaware No Drawing. Application April 7, 1934, Serial No. 719,586. In Germany April 13, 1933

3 Claims. (Cl. 260—69)

The present invention relates to substantive azo-dyestuffs and to a process of making same, more particularly to such containing two stilbenic radicals attached together by means of an azo or azoxy group.

These new dyestuffs are obtained in accordance with this invention by condensing a nitro-stilbene compound of the general formula

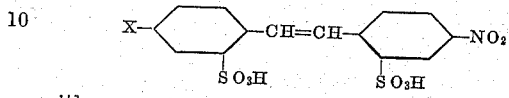

with an amino-stilbene compound of the general formula

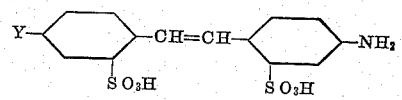

in which formulae X and Y mean nitro, arylazo or arylazoxy groups in the presence of alkali. The products thus obtained may then be subjected to after-treating methods like other azo- or stilbene-dyestuffs.

The proportion of the quantities of the aforesaid two components to be condensed may be varied within large limits.

As methods of after-treatment customary in the manufacture of azo- and stilbene-dyestuffs, there may be named oxidation, reduction, alkylation, formation of metal complexes.

The smooth course of this reaction is surprising as it has hitherto been known to condense nitro-stilbene compounds only with amino compounds not belonging to the stilbene series nor containing more than one negative substituent.

The new dyestuffs dye cotton clear reddish yellow to reddish orange shades of an excellent fastness and are distinguished by a peculiar intensity of color. They surpass the analogous condensation products prepared from nitro-stilbene compounds and from amines containing no stilbene radical by their fastness to water and perspiration.

In order to further illustrate my invention the following examples are given the parts being by weight and all temperatures in centigrade degrees; but I wish it, however, to be understood that my invention is not limited to the particular products or reaction conditions mentioned therein.

Example 1

287 parts of the sodium salt of 4,4'-dinitro-stilbene-2,2'-disulfonic acid and 560 parts of the sodium salt of 4-nitro-4'-amino-stilbene-2,2'-disulfonic acid are dissolved in 4000 parts of water and 600 parts of a caustic soda solution decanormal are added to the solution. Then the mixture is brought to boiling and boiled in an apparatus provided with a reflux condenser until nitro-amino-stilbene-disulfonic acid is no longer detectable which occurs after about 6–10 hours. Then it is cooled down to about 20°, the dyestuff is filtered off by suction and freed from the mother liquor by washing it with salt water of 24° Bé.

In order to brighten the shade the condensation product may be after-treated with a solution of hypochlorite.

When dry the dyestuff represents a brown-red powder dissolving in water with an orange color and in sulfuric acid with a pure blue color. It dyes cotton clear orange shades of an excellent fastness to light. By using higher amounts of nitro-amino-stilbene-disulfonic acid the shade turns to a more reddish one.

Example 2

73.5 parts of the sodium salt of dinitro-azo-di-stilbene-tetra-sulfonic acid of the formula

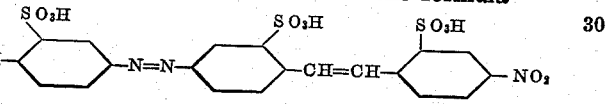

and 56 parts of the sodium salt of 4-nitro-4'-amino-stilbene-2,2'-disulfonic acid are dissolved in 360 parts of water. Then 57 parts of a caustic soda solution of 40% strength are allowed to run into the solution and the whole is brought to boiling. The solution is heated for several hours in an apparatus provided with a reflux condenser until nitro-amino-stilbene-disulfonic acid is no longer detectable. Then the excess of caustic soda lye is neutralized by the addition of hydrochloric acid, the precipitated dyestuff is isolated by filtration and freed from the mother liquor by washing it with salt-water of 24° Bé.

The dried dyestuff is a red-brown powder which dissolves in water with an orange, in concentrated sulfuric acid with a reddish blue color. It dyes cotton clear orange shades.

Example 3

291 parts of the dyestuff, obtained by combining the diazo compound of 4-nitro-4'-amino-stilbene-2,2'-disulfonic acid with phenol and subsequently methylating, are dissolved in 2250 parts of water with 300 parts of the sodium salt of 4-nitro-4'-amino-stilbene-2,2'-disulfonic acid. At 90°, 360 parts of a caustic soda solution of 40% strength are added and the mixture is heated to boiling until the condensation is finished. Then the lye is neutralized, the precipitated dyestuff is isolated by filtration and washed with salt-water of 24° Bé. until the filtrate clearly runs down. After drying, the dyestuff represents a red powder. It dissolves in water with a red-orange, in concentrated sulfuric acid with a reddish blue color and dyes cotton clear red-orange shades.

Example 4

210 parts of the amino-azo-dyestuff (obtained by combining the diazo compound of the 4-nitro-4'-amino-stilbene-2,2'-disulfonic acid with phenol, methylating and subsequently reducing with sodium sulfide) are dissolved with 188 parts of the sodium salt of 4,4'-dinitro-stilbene-2,2'-disulfonic acid in 2500 parts of water. Then 360 parts of caustic soda solution of 40% strength are added and the whole is heated for several hours under a reflux condenser until the amino-azo-dyestuff has disappeared. The dyestuff is filtered off by suction, purified by washing it with salt-water of 6° Bé. and dried. It represents an orange colored powder which dissolves in water with a reddish yellow, in concentrated sulfuric acid with a bluish black color and dyes cotton very pure yellowish red shades.

By using different quantities of amino-azo-dyestuff the shade is turned to yellow or red respectively.

Example 5

138 parts of the dyestuff, obtained by reduction of 4,4'-dinitro-stilbene-2,2'-disulfonic acid with glucose or formaldehyde, are dissolved in 1800 parts of water with 140 parts of the sodium salt of 4-nitro-4'-amino-stilbene-2,2'-disulfonic acid. After the addition of 286 parts of a caustic soda solution of 40% strength the whole is heated for several hours in an apparatus provided with a reflux condenser until the nitro-amino-stilbene-disulfonic acid has disappeared. Then the dyestuff is isolated by washing it with salt-water of 5° Bé., freed from the mother liquor and dried. It represents a brown-red powder and dissolves in water with an orange, in concentrated sulfuric acid with a bluish violet color.

By condensing with 280 parts of the sodium salt of 4-nitro-4'-amino-stilbene-2,2'-sulfonic acid, instead of with the above named 140 parts of this salt, an orange dyestuff is obtained which dissolves in sulfuric acid with a blue color, dyeing cotton more reddish orange shades.

I claim:—

1. The substantive azo-dyestuffs dyeing cotton yellowish red to reddish orange shades of a good fastness and being capable of an after-treatment usual for stilbene azodyestuffs being obtainable by condensing a nitro-stilbene compound of the general formula

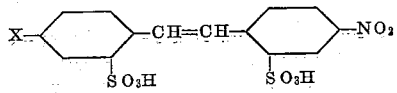

with an amino-stilbene compound of the general formula

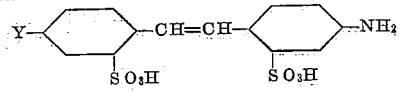

in which formulae X and Y mean nitro, arylazo or arylazoxy groups in the presence of alkali.

2. The azodyestuff dyeing cotton clear orange shades of a good fastness and being obtainable by condensing 4,4'-dinitro-stilbene - 2,2' - disulfonic acid with 4-nitro-4'-amino-stilbene - 2,2' - disulfonic acid in the presence of caustic soda solution and after-treating the dyestuff thus obtained with hypochlorite.

3. The azo-dyestuff dyeing cotton clear orange shades of a good fastness and being obtainable by condensing 4,4'-dinitro-stilbene - 2,2' - disulfonic acid with 4-nitro - 4' - amino-stilbene-2,2'-disulfonic acid in the presence of caustic soda solution.

HANS SCHINDHELM.